(No Model.)
W. A. LOUGHRY.
COMBINED LISTER AND DRILL.
No. 407,084. Patented July 16, 1889.
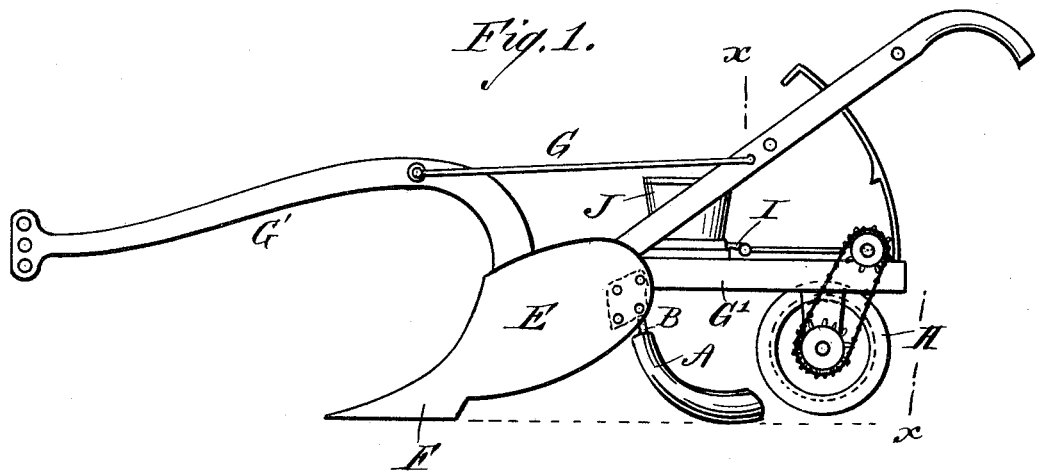
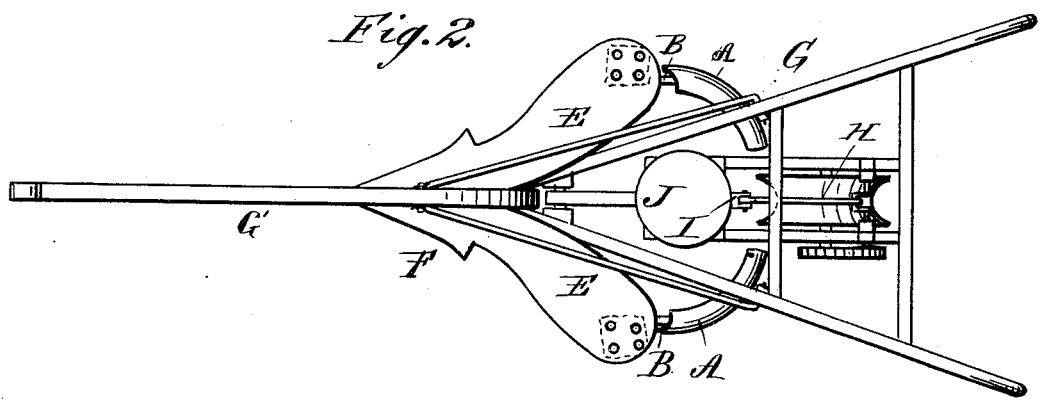
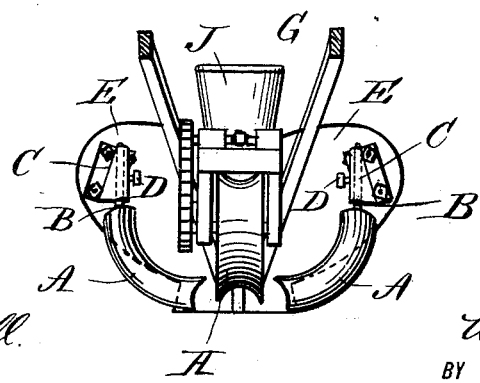
WITNESSES:
Donn Twitchell.
C. Sedgwick
INVENTOR:
W. A. Loughry
BY
Munn & Co
ATTORNEYS.

UNITED STATES PATENT OFFICE.

WILLIAM A. LOUGHRY, OF ODESSA, NEBRASKA.

COMBINED LISTER AND DRILL.

SPECIFICATION forming part of Letters Patent No. 407,084, dated July 16, 1889.

Application filed September 5, 1888. Serial No. 284,647. (No model.)

*To all whom it may concern:*

Be it known that I, WILLIAM A. LOUGHRY, of Odessa, in the county of Buffalo and State of Nebraska, have invented new and useful Improvements in a Combined Lister and Drill, of which the following is a full, clear, and exact description.

The invention relates to machines for planting seeds, such as corn, &c.

The object of the invention is to provide certain new and useful improvements in a combined lister and drill, by which the usual subsoil-plow is entirely dispensed with, and by which the edge of the trench is left at an angle instead of perpendicular, so that the grass will not soon appear at the joint of the turn of the furrow, as is the case generally, and the surface-soil is well buried by the furrows without any break or thin spot favorable to the germination of weed-seed.

The invention consists of adjustable curved concave blades or adjustable concave revolving disks attached to the inside of the mold-board or beam of the plow.

The invention also consists of certain parts in detail, and combinations of the same, as will be hereinafter fully described, and pointed out in the claims.

Reference is had to the accompanying drawings, forming a part of this specification, in which similar letters of reference indicate corresponding parts in all the figures.

Figure 1 is a side elevation of the improvement. Fig. 2 is a plan view of the same, and Fig. 3 is a sectional end elevation of the same on the lines X X of Fig. 1.

The improvement consists of two adjustable curved concave blades A A, each provided at its upper end with a shank B, fitting into a keeper C, and secured therein by a set-screw D or other suitable means. Each keeper C is fastened by bolts or other devices to the inside of the mold-board E of the plow F, forming part of the combined lister and drill G of any approved construction.

Instead of fastening the keeper C to the mold-board, as above described, I may fasten the same to the plow-beam G'.

The blades A are curved downwardly and extend rearwardly toward each other, as plainly shown in the drawings; but the lower ends of the said blades A leave sufficient space for the seed and to form an oval furrow in bottom of trench. Directly behind the lower ends of the blades A, and between the same, is held a groove-wheel H, mounted to rotate in suitable bearings fastened to the rear end of the plow-beam G, and serving to tamp and leave in an oval form the ridge in the bottom of the trench formed by the blades A.

The wheel H imparts motion to a suitable device for operating the slide I, connected with the seed-box J, located on top of the plow-beam G, directly above the blades A, so that the seed is discharged into the trench formed by the plow F, and is covered up by the ridge formed in the trench by the blades A.

The ridge formed by the blades A is tamped and left in an oval form by the groove-wheel H, as before mentioned, so that the seed planted in the trench will readily germinate in a dry season, and at the same time preventing an early germination of weed-seeds, this form of ridge in bottom of trench allowing an earlier cultivation of corn, &c., by the use of the harrow or the cultivator, than can be obtained by any other form of lister and drill now in use.

It will further be seen that the soil thrown over by the plow F buries the surface between the trenches without any break or thin spot to allow the early germination of weed-seeds.

Having thus described my invention, I claim as new and desire to secure by Letters Patent—

1. The combination, with a listing-plow, of concave and inwardly-curved blades secured to the plow, substantially as described.

2. The combination, with a combined lister and drill, of the concave and inwardly-curved blades A, adjustably secured to the inside of the mold-board, substantially as herein shown and described.

3. The combination, with the combined lister and drill, of two inwardly-curved and concave blades attached to the inside of the mold-board extending downward toward each other, and a grooved wheel held on the combined lister and plow in the rear of the said blades, the said wheel imparting motion to the slide of the seed-box, substantially as shown and described.

WILLIAM A. LOUGHRY.

Witnesses:
J. S. GREENWOOD,
JOHN HOGE.